«United States Patent                     [15]   3,635,806
Heckert                                    [45]   Jan. 18, 1972

[54] PHOTOCHEMICAL BLEACHING OF POLYMALEATE HOMOPOLYMERS AND COPOLYMERS IN THE PRESENCE OF A PERACID

[72] Inventor: David C. Heckert, Oxford, Ohio
[73] Assignee: The Proctor & Gamble Company, Cincinnati, Ohio
[22] Filed: Oct. 27, 1969
[21] Appl. No.: 869,910

[52] U.S. Cl..................204/159.14, 8/111, 204/159.18, 252/94, 260/78.4 R, 260/78.5 T
[51] Int. Cl. ............................................D06i 3/02, B01j 1/00
[58] Field of Search......................8/111; 204/159.14, 160.1

[56] References Cited

UNITED STATES PATENTS 3,496,150   2/1970   Kropp..................................260/78.4
3,467,575   9/1969   Wayman et al..........................8/111
2,720,440   10/1955  Wallace.................................8/111

OTHER PUBLICATIONS

Hirschkind et al., Pulp Bleaching under Ultraviolet Light, Paper Trade Journal, Oct. 1937, pp. 118- 119

*Primary Examiner*—Murray Tillman
*Assistant Examiner*—Richard B. Turer
*Attorney*—Louis G. Xiarhos and Julius P. Filcik

[57]                  ABSTRACT

The photochemical bleaching of polymaleate homopolymers and copolymers by the process which comprises irradiating a polymaleate material with ultraviolet light in the presence of an inorganic peracid and a solvent having low absorptivity for irradiation.

15 Claims, No Drawings 3,635,806

PHOTOCHEMICAL BLEACHING OF POLYMALEATE HOMOPOLYMERS AND COPOLYMERS IN THE PRESENCE OF A PERACID

FIELD OF THE INVENTION

This invention relates to a process for leaching polymaleate materials including homopolymers and copolymers thereof. More specifically, it relates to a process of bleaching polymaleate materials by a photochemical technique embodying the use of ultraviolet irradiation and an inorganic or organic peracid. As employed hereinafter in the specification and claims, the term polymaleate is intended to include the various polymeric forms of maleic acid, maleic anhydride and water-soluble salts of maleic acid.

Polymaleate materials have become important for a number of purposes. For example, poly(maleic acid) and especially the water-soluble salts thereof, are excellent sequestering materials and are particularly adapted to use in built detergent formulations containing a detergent surfactant. In addition they are useful as textile chemicals and in the surface treatment of metals.

Satisfactory methods of preparing homopolymers of maleic anhydride have only recently been known. For example, U.S. Pat. No. 3,359,246 to Berry, describes the polymerization of maleic anhydride to form a high molecular weight homopolymer by reacting a melt of maleic anhydride and employing an acetyl peroxide catalyst. Similarly, U.S. Pat. No. 3,186,972 to Lang et al. describes the preparation of homopolymers of maleic anhydride by a process which employs the irradiation with gamma rays from a cobalt 60 source of a maleic anhydride solution in acetic anhydride. The anhydride homopolymers prepared in accordance with the above methods, for example, can conventionally be converted to their acidic form by hydrolysis employing methods known to those skilled in the art. Similarly, the alkali metal salts thereof can be conventionally prepared by merely neutralizing with a soluble alkali metal hydroxide.

Irrespective of the precise methods employed in the formation of homopolymers of maleic anhydride, such polymers have been characterized by an undesirable reddish-brown to yellow color. These undesirable color characteristics detract from the overall attractiveness and acceptability of detergent formulations containing these materials and are unattractive from a commercial standpoint. In addition, the coloration detracts from the performance of detergent formulations containing polymaleate salt builders derived from poly(maleic anhydride) materials in that they tend to precipitate as calcium salts or complexes onto the fabrics which are laundered, thereby creating an unattractive appearance.

Various attempts have been made in the art to produce polymaleates which are substantially free from objectionable color. These attempts have included the employment of carefully controlled process conditions. In addition, known decolorization and bleaching techniques have been employed in an attempt to minimize the color generally found in the preparation of such materials. For example, decolorization treatments have included absorption of color by activated charcoal, Carlton's earth, Fuller's earth, oxidative bleaching with hypochlorite, ozone, hydrogen peroxide, reductive treatment with sodium borohydride, sodium bisulfite, sulfur dioxide, and hydrogenation under a wide variety of conditions. Such attempts have not been satisfactory. Frequently the result has been unsatisfactory levels of bleaching, unstable or reversible bleaching or unsatisfactory processing efficiency from the standpoints of time, elevated temperatures and required amounts of bleaching agent.

It is an object of the present invention to provide an efficient process for improving the color of polymaleate materials including homopolymers and copolymers thereof.

It is a further object to provide a novel process for bleaching polymaleate materials by a photochemical technique.

It is another object to provide a novel photochemical bleaching process which enables the provision of polymaleate materials adapted to use in substantially white detergent formulations.

Other objects will become obvious from the description of the invention which hereinafter follows.

SUMMARY OF THE INVENTION

These and other objects are achieved in accordance with the present invention which comprises a process of bleaching a polymaleate homopolymer or random copolymer containing at least 45 mole percent of a maleate component selected from the group consisting of maleic anhydride, maleic acid and water-soluble salts of maleic acid which comprises irradiating the polymaleate homopolymer or random copolymer with ultraviolet light in the presence of an organic or inorganic peracid to provide a polymaleate of improved color. In accordance with the present invention a polymaleate material is photobleached by a process which comprises dissolving the polymaleate in an appropriate solvent having low absorptivity for irradiation and irradiating in the presence of a peracid with a source of ultraviolet radiation for a time sufficient to effect an improvement in the color characteristics of such polymaleate material.

DETAILED DESCRIPTION OF THE INVENTION

The novel photochemical bleaching process of the present invention is conveniently practiced by irradiating the polymaleate material with a suitable radiation source hereinafter described in the presence of noninterfacing solvent having low-irradiative absorptivity. Noninterfering solvents as employed herein are those solvents which are capable of dissolving the polymeric starting material and peracid and which do not substantially interfere with the transmission of the ultraviolet radiation or react with the peracid component. Suitable solvents of low-irradiative absorptivity are those which have low absorptivity for the radiation sources hereinafter described. These solvents will normally transmit at least 90 percent of the incident light. Organic solvents which absorb substantial amounts of incident radiation and/or interfere with the photobleaching process by conversion to undesirable side products are to be avoided.

Suitable solvents are to be found in such materials as water, alkanols, alkyl ethers, aromatic ethers, mixed alkyl aromatic ethers, cyclic ethers and glycol ethers. Examples of suitable alcohol solvents include alkyl monohydric alcohols of from one to about 10 carbon atoms, as for example, methanol, ethanol, n-propyl alcohol, isopropyl alcohol, t-butyl alcohol, 2-ethylhexyl alcohol and n-decyl alcohol. Aliphatic dihydric alcohols include those having from two to about 10 carbon atoms, as for example alkylene glycols such as ethylene glycol, propylene glycol, 1,6-dihydroxyhexane and 1,10-dihydroxydecane.

Examples of suitable ether solvents are those having from two to about 10 carbon atoms including dialkyl ethers such as dimethyl ether, diethyl ether, dioctyl ether, diaryl ethers such as diphenyl ether, mixed alkyl aryl ethers such as methyl phenyl ether, cyclic monooxy ethers such as tetrahydrofuran, cyclic dioxy ethers such as dioxane and glycol ethers such as 1,2-dimethoxyethane and diethylene glycol dimethyl ether.

Preferred solvents are water and the alkanols for the reasons that they are readily available and do not interfere with the irradiation treatment. Since water readily converts maleic anhydride polymers to their acidic form, water is not preferred where the anhydride structure is desirably left intact. It will be appreciated of course that the foregoing exemplary solvents can be used in combination and that they are listed by way of example only. Other solvents similarly noninterfering in nature may likewise be employed to advantage.

The solutions photobleached by the methods of the invention contain the polymeric compound in an amount by weight of from about 0.01 percent to about 50 percent. While solutions wherein the polymer is present in amounts in excess of the limit of solubility can be employed, it is preferable from the standpoint of efficiency of operation and uniformity in decolorization to employ solutions having the dissolved polymer present in an amount approximating the limit of solubility. The limit of solubility of such materials depends normally upon the particular solvent employed and the molecular weight of the polymer employed. Poly(maleic anhydrides) and poly(maleic acid) homopolymers prepared in accordance with conventional techniques known to those skilled in the art range in molecular weight from about 300 to possibly about 50,000. These materials when photobleached in water are generally employed in solutions at about the 0.01 percent to about 50 percent level, preferably at about 10 percent to about 20 percent.

The peracid compounds of the invention include the organic and inorganic peracids. Suitable organic peracids include the monobasic peracids corresponding to the formula R—$CO_3H$
wherein R is hydrogen; alkyl of from one to 10 carbon atoms; or aryl of from six to 20 carbon atoms; and the dibasic peracids corresponding to the formula X—$(R_1)_x$—Y
wherein $R_1$ is alkylene of from one to about eight carbons; alkenylene of from two to about eight carbon atoms; or phenylene of from six to about 20 carbon atoms; X is —$CO_3H$; Y is —$CO_2H$ or —$CO_3H$; and $x$ is zero or one.

Examples of monobasic organic peracids of the invention include the alkanoic peracids such as performic acid; peracetic acid, perpropanoic acid, per-n-butanoic acid, per-iso-butanoic acid, perpentanoic acid, perhexanoic acid, perheptanoic acid, peroctanoic acid, perdecanoic acid and the like. Preferred alkanoic peracids include performic and peracetic acids which provide excellent bleaching effects and which are readily available.

Suitable aromatic peracids include perbenzoic acid, pernapthanoic acid and the like, perbenzoic acid being preferred for its excellent bleaching results and ready availability. The aromatic peracids of the invention can obtain substituents so long as they are noninterfering, i.e., do not substantially interfere with the bleaching method of the invention. Suitable substituted organic peracids of the invention include ortho-, meta-, or para-chloro-perbenzoic acid, ortho-, meta-, or para-nitroperbenzoic acid, and the like.

Examples of organic dibasic peracids having one or two peracidic moieties include peroxalic acid, permalonic acid, permaleic acid, persuccinic acid, perglutaric acid, peradipic acid, perpimelic acid, perphthalic acid, perterephthalic acid, and the like.

Inorganic peracids can also be employed in the process of the invention. Suitable inorganic peracids include persulfuric acid, pernitric acid, perphosphoric acid, and perchloric acid, persulfuric acid being preferred herein.

The amount of organic or inorganic peracid employed herein is a minor amount based upon the weight of polymaleate component subjected to irradiation by the method of the invention and corresponds to a ratio of organic or inorganic peracid or polymaleate by weight of from about 1:1000 to about 1:10. A preferred ratio is from about 1:2000 to about 1:40. It is a desirable advantage of the photochemical method of the invention in terms of economy and efficiency of operation that only minor amounts of peracid need be employed to rapidly effect high levels of polymaleate bleaching. Ten percent aqueous solutions of poly(maleic acid), for example, can be rapidly photobleached to colorless solutions by irradiating in the presence of about 0.1 percent of performic acid.

The solutions photobleached herein are prepared by mixing in any order the poly(maleic anhydride), poly(maleic acid), water-soluble salt thereof or polymaleate copolymer with an appropriate noninterfering solvent of the hereinbefore described type and an organic or inorganic peracid component. Preferably, the peracid or a solution thereof is added to a solution of the polymaleate component.

The peracid component of the invention can be employed in any of the known and commercially available forms.

Preferably, a solution of peracid is added to a solution of polymaleate component in an amount sufficient to provide the requisite ratio of such components described hereinbefore.

The reaction vessels used in the irradiation of polymaleate materials are not critical and include Quartz, Vycor, Corex, Pyrex or common soft glass reaction vessels. Pyrex reaction vessels are preferred herein but should not be used when wavelengths less than 280 m$\mu$ are desired as Pyrex tends to filter out wave lengths below 280 m$\mu$. The photochemical bleaching process of the present invention can be carried out in conventional photochemical reaction vessels. A convenient method of practicing the present invention comprises irradiating a solution hereinbefore described in a standard Pyrex reaction vessel equipped with means for a gaseous purge to provide agitation of the solution during irradiation and having a jacketed, water-cooled Quartz, Vycor, or Pyrex immersion well into which is placed the ultraviolet light lamp source. The immersion well containing the ultraviolet light lamp source can be placed near or within the solution which is photobleached. When direct sunlight is employed as the ultraviolet light source, a convenient method of effecting the photochemical reaction of the present invention is to place a solution of the polymaleate in a conventional reaction vessel at ambient temperatures into the path of directly incident sunlight.

Any convenient source of ultraviolet radiation can be used in the novel bleaching process of the invention. As used herein, ultraviolet radiation refers to electromagnetic radiation having a wavelength of from about 200 m$\mu$ to about 400 m$\mu$. It will be appreciated that light sources which emit in the ultraviolet region as herein defined will frequently emit in the visible region as well. Such broad-spectrum sources emitting in the ultraviolet region as defined herein and throughout the 200 m$\mu$ to about 700 m$\mu$ range can be suitably employed herein.

Suitable radiant energy sources which can be employed herein include black light mercury vapor lamps, photoflood lamps, sunlamps, fluorescent lamps, sunlight and the like. Similarly, lamps which operate on the principle of a zinc, cadmium, thallium, gallium, indium, carbon, mercury, zirconium, hydrogen, deuterium, zenon or helium arc can likewise be employed in the exercise of the present invention.

The light sources employed herein are those which have substantial intensity. Substantial intensity as employed herein refers to light of sufficient intensity to provide the irradiated sample with about $1\times10^{-10}$ to about $1\times10^{-5}$ einsteins/sec/$cm^3$. Natural daylight, as opposed to directly incident sunlight, is not suitable inasmuch as its intensity is not substantial as employed herein and does not effect appreciable photobleaching.

Preferred lamps for employment in the present invention include commercially available high-pressure mercury arc lamps having a total power capacity ranging from about 50 watts to about 10,000 watts, preferably from about 100 watts to about 600 watts. These lamps emit a broad spectrum of light including ultraviolet radiation. Likewise preferred are the low-pressure mercury lamps having a total power capacity ranging from about 0.5 watt to about 50 watts, preferably from about 0.5 watt to about 2 watts. These lamps emit monochromatic light generally in wave lengths of about 253.7 m$\mu$ or with the addition of suitable phosphors in the regions of 300 m$\mu$ and 355 m$\mu$ for example. Other utilizable light sources are ordinary fluorescent lamps which emit in the 350 m$\mu$ region of the light spectrum. The lamps hereinbefore described are well known to those skilled in the art and are commercially available. Suitable lamps are described in greater detail in "Ultraviolet Radiation" by L. R. Coller, 2nd Edition, John Wiley & Sons, Inc., (1952), which disclosure is incorporated herein by reference.

For optimum photobleaching effect, it is preferred to employ a source which has its greatest energy distribution concentrated within the range of about 330 m$\mu$ to about 400 m$\mu$.

While the precise mechanism by which polymaleates are effectively decolorized is not completely understood, it is believed that irradiation within a preferred range of from about 300 mμ to about 400 mμ effects activation of chromophoric bodies and the peracid component thereby providing excellent bleaching effects. Radiation outside this preferred region is believed to activate principally the chromophoric bodies of polymaleate materials. It will be appreciated that electromagnetic radiation in a desired range can be provided by employing lamps which emit principally in the desired region or by employing a combination of light source and filters. For example, mercury arc lamps of the hereinbefore described types emitting a broad spectrum of light can be employed with suitable filters such as Pyrex to narrow the wave length to about 280 mμ to about 700 mμ

The novel photochemical reaction of the present invention can be carried out over a wide range of temperatures. For example, the reaction can be conducted at a temperature from about -40° to about 150° C. A preferred temperature range is from 0° C. to about 60° C. When the reaction is conducted at room temperature, i.e., at about 25° C., the reaction is primarily photochemical rather than thermal in nature. Because many of the lamps employed in the present invention evolve heat, e.g., high-pressure mercury lamps, some sort of cooling device is preferably employed to maintain the temperature of the photobleaching process within the prescribed temperature limits.

Any suitable reaction pressure can be employed, the pressure generally ranging from about atmospheric to about 1,000 p.s.i.g. depending on the photobleaching temperature, the nature of the solvent employed and the like.

The photochemical process can be conducted either batchwise or continuously, batchwise photobleaching being preferred. The constituents which comprise the solution irradiated as hereinbefore described can be introduced into a suitable irradiated zone or the constituents can be premixed and introduced into the irradiated zone as a mixture or mixtures.

It is preferred that the photochemical reaction of the present invention be conducted with agitation of the reactants. This can easily be accomplished by bubbling an inert gas such as nitrogen through the reaction medium during the irradiation. Other suitable means of agitating the material to be photobleached include the use of a falling film technique or conventional stirring.

An especially preferred means of effecting agitation involves contacting the polymaleate material with air or oxygen. It has been found quite unexpectedly that the passage of air or oxygen through the irradiated solution, in addition to providing desired agitation, hastens the decolorizing process of the invention. A suitable flow rate is from about 0.05 to about 10 liters/hour of air or oxygen per gram of polymaleate material, a preferred rate being from about 0.1 to about 0.5 liters/hour. The hastening effect is observed in spite of the tendency of air or oxygen, in the absence of irradiation, to increase the formation of undesirable color bodies. The use of air or oxygen during irradiation is, thus, a preferred embodiment of the invention and enables the attainment of enhanced levels of photobleaching.

Similarly, a hastening effect has been found in the case of the added presence of an inorganic mineral acid in the irradiated polymaleate solution. According to a preferred embodiment of the invention, an inorganic mineral acid is employed in an amount by weight of the polymaleate component of from about 0.5 percent to about 10 percent. A preferred amount is from about 1 to about 5 percent. Suitable inorganic mineral acids include sulfuric acid, nitric acid, hydrochloric acid, phosphoric acid, perchloric acid, and the like. Preferred are sulfuric acid, nitric acid, and perchloric acid.

The photochemical irradiation of the present invention is conducted for a time sufficient to effect photobleaching which for purposes of the present invention refers to the attainment of improved color characteristics as well as to bleaching to substantial whiteness. While polymaleate materials are generally photobleached to an improved color in about 1 minute to about 100 hours, and preferably in about 10 minutes to 3 hours, the amount of time required to effect an improvement depends at least in part on the initial color of the sample prior to irradiation, the concentration of the polymaleate material in the solvent or vehicle, the relative amount of peracid employed, the temperature of reaction, the size of the sample which is irradiated, the physical proximity of the light source to the irradiated sample and the intensity of the light source employed.

The decolorized or photobleached polymer irradiated as described hereinbefore is removed from solution by conventional separation techniques known to those skilled in the art, as for example, by evaporation, freeze drying, filtration, coacervation or precipitation. A preferred technique is that of neutralization followed by heat or freeze-drying.

The polymaleate materials which can be photobleached in accordance with the present invention include any of the poly(maleic anhydride) and poly(maleic acid) materials prepared by those methods known to those skilled in the art. Likewise the colored water-soluble salts of poly(maleic acid) can be photobleached to advantage employing the photochemical method of the present invention. These materials have molecular weights ranging from about 300 to about 50,000. Examples of homopolymeric polymaleates which can be bleached by the process of the present invention are described in U.S. Pat. No. 3,359,246 to Berry and in U.S. Pat. No. 3,186,972 to Lang et al., which references are incorporated herein by reference.

Homopolymeric maleic anhydride materials of U.S. Pat. No. 3,359,246 include those prepared by polymerizing maleic anhydride to form polymers having a molecular weight greater than about 300 by a process which comprises the steps of adding to a melt of said maleic anhydride from about 0.5 percent to about 8 percent by weight of the maleic anhydride of acetyl peroxide, maintaining the temperature from about 55° C. to about 150° C. and preferably recovering the polymer from the reaction mixture.

Especially desirable results are obtained in the above process when either or both of the following conditions are met: the acetyl peroxide is present in an amount from about 2 percent to about 6 percent by weight of the maleic anhydride; the temperature is maintained from about 70° C. to about 130° C. Outstanding results are obtained when about 5 percent of the acetyl peroxide is used. The polymer obtained from the process of U.S. Pat. No. 3,359,246 is substantially free from nonremovable impurities, both colormetric and odoriferous. Nevertheless, when dissolved in water at a 10 percent by weight concentration, the polymer obtained by this process is characterized by a fairly light straw color.

It is difficult to measure precisely the molecular weight of polymaleates of the type herein described and different values can be obtained depending on the method of analysis used. Cryoscopic measurements indicate the molecular weight of poly(maleic anhydride), for example, to be in the range of about 300 to 1,000. Light scattering results indicate a molecular weight ranging possibly up to 50,000. However, the most accurate method for determining the molecular weight of maleic anhydride homopolymers consist of ultracentrifugal measurements. Ultracentrifugal results indicate a poly(maleic anhydride) molecular weight of from about 3,500 to about 7,000, the most probably molecular weight being 5,200±1,000. Gel filtration studies on Sephadex columns generally confirm the above-mentioned 5,200±1,000 molecular weight result.

The maleic acid anhydride homopolymers prepared according to U.S. Pat. No. 3,186,972 are characterized by relatively high molecular weight and are prepared by irradiating maleic anhydride in a nonsolid, nongaseous form, i.e., in liquid form or in solution, such as dissolved in a nonpolymerizable liquid, with high energy ionizing radiation such as gamma rays or X-rays of an intensity of at least 10,000 rads per hour and for a total dose of from about 2 to about 60 megarads. Polymers prepared in accordance with this method are characterized by relatively high molecular weights as determined by intrinsic viscosity measurements. The materials are characterized by an intrinsic viscosity of at least 0.05 deciliter per gram or greater as determined in 2-butanone.

The hereinbefore described homopolymers of maleic anhydride are readily converted to poly(maleic acid) polymers by hydrolysis. This can be effectuated by dissolving the poly(maleic anhydride) polymer in water at room temperatures. Generally it is preferable to employ heating so as to assure complete cleavage of the anhydride bonds and formation of acidic moieties.

Metallic salts of the above described poly(maleic acids) can be prepared by neutralization with a soluble oxide or hydroxide of the desired metal. For example, alkali metal salts such as the sodium, potassium and lithium salts can be prepared by numerous acid-base conversion reactions which are well known in the art. A particularly desirable method is as follows: Dissolving poly(maleic anhydride) in water and heating at from 90° C. to about 100° C. for a period of time of approximately 0.5 hour; neutralizing the aqueous poly(maleic acid) thus obtained with an alkali solution, for example, NaOH, up to a pH of 10.0; heating on a steam bath for a period of time ranging from about 3 to about 4 hours; and readjusting the pH to about 10.0. The solid alkali metal (e.g., sodium) polymaleate may be recovered from the above solution by any of several methods such as evaporation, freeze-drying, filtration, coacervation, or precipitation. This latter method can be effectuated, for example, by pouring a concentrated aqueous solution of the polymer into rapidly sheared ethanol; the partially dried polymaleate salt thus obtained can be further dried in a vacuum oven.

Other polymaleate materials which can be photobleached by the process of the present invention to provide polyelectrolyte builders especially adapted for use in detergent compositions are certain random copolymers of maleic acid, maleic anhydride or water-soluble salts thereof and comonomers wherein the polymaleate component constitutes a substantial portion of the polymeric structure. These copolymers are characterized by the presence therein of the polymaleate species in a proportion of at least 45 mole percent and are formed by randomly polymerizing the maleate monomer with a comonomer having the general formula

wherein each R is selected from the group consisting of hydrogen, methyl, carboxyl, carboxymethyl and carboxyethyl wherein only one R can be methyl. Preferred polyelectrolyte copolymers having about 50 to about 80 mole percent maleate species can likewise be readily bleached by the photochemical method of the present invention.

As employed herein the term random copolymer is intended to embrace those copolymers wherein each comonomer is present in the polymer in both single and multiple units. Thus, copolymers of a maleate component and a comonomer wherein the maleate and comonomeric species are present in a 1:1 alternating structure are not contemplated as being within the scope of the copolymers susceptible of being photobleached by the process of the present invention. Since the undesirable color which is found in maleate homopolymers is also present in maleate copolymer wherein the maleate specie or species are present in consecutively repeating units, it is an essential aspect of the present invention that the maleate copolymers of the present invention be random copolymers.

The comonomers which can be polymerized with maleic anhydride, maleic acid or an alkali metal (e.g., Na, K, Li, Ce) salt of maleic acid to form random copolymers suceptible of photobleaching by the effect of ultraviolet light and peracid and use as polyelectrolyte builders include, for example, ethylene, propylene, acrylic acid, methacrylic acid, itaconic acid, crotonic acid, 3-butenoic acid and 3-methyl-3-butenoic acid. Specific examples of copolymers which can be photobleached by the process of the present invention to provide white or near-white copolymers include a 1:1 random copolymer of propylene and maleic acid; a 1:3 random copolymer of acrylic acid and maleic anhydride; a 1:4 random copolymer of 3-butenoic acid and maleic acid; a 1:1.9 random copolymer of methacrylic acid and maleic anhydrid; a 1.2:1 random copolymer of crotonic acid and maleic acid; a 1:1.5 random copolymer of ethylene and maleic anhydride; and a 1:8 random copolymer of 3-methyl-3-butenoic acid.

The random copolymers hereinbefore described which can be bleached in accordance with the process of the present invention are characterized by molecular weights ranging from about 350 to about 1,500,000. These random copolymers when photobleached by the effect of ultraviolet light and peracid are characterized by a substantially white appearance and accordingly find application as polyelectrolyte builders in detergent compositions.

While the hereinbefore described polymaleate materials relate principally to homopolymers of maleic anhydride, maleic acid, and water-soluble salts of maleic acid and to random copolymers containing a substantial or predominant amount of maleate species and certain comonomer species, particularly adaptable for use as polyelectrolytes in the detergent arts, it will of course be appreciated that other copolymers having a substantial or predominant portion of maleate species adaptable to use in other arts may likewise be photobleached by the process of the present invention so long as the polymers are characterized by the presence of repeating maleate units.

The photobleaching process of this invention proves a means of decolorizing polymaleate materials more efficiently in terms of time than either electromagnetic irradiation alone or peracid treatment alone. Moreover, the combined peracid and irradiative treatment provides an effective and convenient means of decolorizing, in an aqueous or other vehicle, polymaleate materials which as a class are not readily decolorized by conventional means.

EXAMPLES

The following examples illustrate specific preferred embodiments of the present invention and are intended as being illustrative rather than limitative. All percentages and ratios in the following examples as well as in this specification and in the appended claims are by weight unless otherwise indicated. Temperatures are expressed in degrees centigrade. Oxygen or airflow where employed, was at the rate of 0.1 liter per hour per gram of polymaleate material. In the following examples the extend of decolorization, where graded, was graded on the basis of the following color scale, which for convenience may be denoted as the Berry Color Scale. In this color grading system the grade 0 is ascribed to the color which corresponds to an equivolume mixture of a 5 percent aqueous solution of cobaltous chloride hexahydrate and a 0.5 percent aqueous solution of potassium dichromate. Higher grades, X, represent an X to 1 dilution of the 0-grade solution. Thus, a 200 grade is ascribed to a solution which is a 200:1 dilution of the O-grade solution. Similarly, a grade of 500 represents a 500:1 dilution of the O-grade solution. The O-grade solution, i.e., the equivolume mixture of cobaltous chloride hexahydrate and potassium dichromate solutions represents a color corresponding to dark amber or strong tea. Solutions have a 200 grade have a faint yellowish coloration barely distinguishable from plain water. A 500-grade solution has a color which corresponds virtually to water. Ten percent aqueous solutions of the lightest poly(maleic acid) polymers prepared by any process known in the art yield a color grade of about 20 to 40 which corresponds to a light straw color. As will hereinafter become apparent, polymaleates can be substantially improved in color when they are irradiated with an ultraviolet source in the presence of a peracid. For example, polymaleate materials of a low Berry Color Grade, i.e., about 10, can be improved to about 50 in a short period of time so as to render feasible their use in detergent compositions. With further irradiation they can be rendered substantially white, this term meaning a color grade of about 200.

EXAMPLE I

A solution of poly(maleic acid) in water was prepared as follows: poly(maleic anhydride) was dissolved in a small amount of water, heated to boiling to effect conversion to the acid form and cooled to room temperature, i.e., approximately 25° C. The solution was further diluted with water so as to obtain a solution of poly(maleic acid) in water of about 10 percent by weight. The poly(maleic anhydride) employed in the preparation of this solution was obtained by polymerizing maleic anhydride and 2 percent by weight of acetyl peroxide in benzene in accordance with U.S. Pat. No. 3,359,246 and was a homopolymer characterized by a molecular weight of about 4,000 to about 6,000 as determined by ultracentrifugal and gel filtration studies.

A 10 ml. sample of this aqueous solution was placed in a 4-dram vial to which was added 0.06 ml. of a premixed 1:1 solution of 30 percent hydrogen peroxide and 90 percent formic acid. The resulting solution contained 1 percent performic acid by weight of the poly(maleic acid). The vial was placed adjacent to and approximately 3 inches from the center of a conventional Pyrex water-jacketed photochemical reaction vessel. A 450-watt high-pressure mercury lamp having a total radiating energy of 175.8 watts was placed into the photochemical reaction vessel. The solution was agitated by means of a stream of nitrogen gas passing into the solution through a micropipette placed at the bottom of the vial. The solution was irradiated for a 2-hour period. The high-pressure mercury lamp employed in this example was a Hanovia 679 A–36 lamp characterized by the following spectral characteristics in watts:

| Far U.V. 2,200 A.– 2,800 A. | Middle U.V. 2,800 A.– 3,200 A. | Near U.V. 3,200 A.– 4,000 A. | Visible 4,000 A.– 6,000 A. | Infra-red 10,000 A.– 14,000 A. | Total radiated energy |
|---|---|---|---|---|---|
| 27.0 | 28.7 | 28.0 | 75.7 | 16.4 | 175.8 |

Prior to irradiation the starting solution had a color grade of 25 which corresponds to a straw-yellow color. Upon irradiation with ultraviolet light for a period of 1 hour, a color grade of 65 was attained. A color grade of 85 was attained after 2 hours of irradiation. Further irradiation photobleaches to an essentially colorless solution.

EXAMPLE II

The procedure of example I was repeated except that air was used in place of nitrogen to agitate the solution. Upon irradiation for a period of 2 hours the color grade was 125 and after 4 hours, 200 (essentially colorless). A control sample allowed to react under the same conditions but without irradiation had a color grade of from 30 to 40 after a 4 hour period.

Similar results are obtained when the vial samples of examples I and II are irradiated by placement into the path of directly incident sunlight. Irradiation with direct sunlight in lieu of the irradiation of examples I and II effects rapid decolorization.

EXAMPLE III

The procedure of example I was repeated except that an air flush was employed in place of nitrogen and the sample was irradiated by placing the sample into the center of a circular array of 16, 8-watt daylight fluorescent lamps. The circular array of lamps is commercially available (distributed by the Southern New England Ultraviolet Company, Middletown, Conn.) as an array of lamps in a circle of 10 inch diameter as the Rayonet Photochemical Reactor. The solution had a color grade of 25 prior to irradiation in the described manner. A color grade of 75 was attained after 1 hour of irradiation. 4 hours irradiation effected decolorization to a color grade of 150.

EXAMPLE IV a nitrogen

A 10 ml. sample of freshly prepared 10 percent poly(maleic acid) solution was placed in a 4-dram vial along with 0.06 ml. of 40 percent peracetic acid ($CH_3CO_3H$) to give a solution which was 2.4 percent $CH_3CO_3H$ by weight of the poly(maleic acid). The sample, which has a color grade of 40, was irradiated with a nitrogen flush as in example I. After 1 hour, the sample had been decolorized to a color grade of 150. A control sample (color grade 40) which contained 2.4 percent $CH_3CO_3H$ and which was not irradiated was decolorized to a grade of 60 after 4 hours. An additional control sample having a color grade of 35 was irradiated in the above-described manner except that no peracetic acid was employed, i.e., irradiation alone was used. A color grade of 60 resulted after 4 hours of irradiation.

Similar results are obtained when the following peracids are employed in lieu of peracetic acid in that rapid decolorization of poly(maleic acid) solutions is obtained: per-n-propanoic acid, per-iso-propanoic acid, per-n-butanoic acid, per-iso-butanoic acid, perpentanoic acid, per-hexanoic acid, perheptanoic acid, peroctanoic acid, perdecanoic acid; perbenzoic acid; and pernaphthanoic acid.

EXAMPLE V

The procedure of example IV was followed except that an air flush was used to agitate the sample during irradiation. From an initial color grade of 35, an irradiation period of 1 hour resulted in a color grade of 100; a 2-hour irradiation period gave a color grade of 175 and 4 hours of irradiation provided a color grade of 200.

EXAMPLE VI

The procedure of example IV was followed except that an air flush was used and 0.03 ml. of $H_2SO_4$, 6 percent by weight of the poly(maleic acid), was added to the sample, The initial color grade was 40. After a 1-hour irradiation period, the solution color grade was 150; after 4 hours, the color grade was 300 (substantially colorless).

EXAMPLE VII

Example IV was repeated except that an air flush was used and the solution was irradiated with a circular array of 16, 8-watt Rayonet RPR-3500 lamps emitting principally in the 350 mµ region in a total amount of 21 watts. The reactor module is described in example II. From an initial color grade of 35, irradiation for 1 hour resulted in a color grade of 125; 4 hours irradiation provided a color grade of 200.

EXAMPLE VIII

The procedure of example VII was followed except that 16, 8-watt G.E. Daylight fluorescent lamps in a Rayonet circular array were used for the irradiation. A sample with a color grade of 30 was photobleached to a color grade of 125 in 1 hour and to a grade of 300 after 4 hours.

EXAMPLE IX

Example IV was repeated except that oxygen was used in place of nitrogen to agitate the solution during irradiation. A sample with an initial color grade of 35 was decolorized to a grade of 175 after an irradiation period of 1 hour. After 2 hours the resulting color grade was 300 and after 4 hours a color grade of 400 was attained.

EXAMPLE X

A 10 ml. sample of poly(maleic acid) solution with an initial color grade of 35 was bleached as in example I using 2 percent by weight of the poly(maleic acid) of peroxalic acid in place of performic acid. The peroxalic acid was prepared by dissolving 0.020 g. of oxalic acid in 0.030 ml. of 30 percent $H_2O_2$ and allowing the mixture to stand for one-half hour. After a 1-hour irradiation period, the solution had a color grade of 75 and was photobleached to a color grade of 100 after 4 hours. A control sample having a initial color grade of 40 was allowed to react in the same manner but without irradiation. A color grade of 45 resulted after the passage of 4 hours.

Similar results are obtained when the following peracids are employed in lieu of peroxalic acid in that rapid decolorization of poly(maleic acid) solutions is obtained: permalonic acid, permaleic acid; persuccinic acid; perglutaric acid; peradipic acid; perpimelic acid; perphthalic acid; and perterephthalic acid.

EXAMPLE XI

A sample of poly(maleic acid) bleached as in example X but using an air flush achieved a color grade of 100 after 1 hour or irradiation and a grade of 200 after 4 hours.

EXAMPLE XII

The procedure of example I was followed except that 1 percent by weight of the poly(maleic acid) of m-chloroperbenzoic acid was used in place of performic acid. The peracid was present in excess of its solubility. The sample had an initial color grade of 40. Irradiation for 1 hour decolorized the sample to a color grade of 70. A color guide of 100 was attained after 4 hours irradiation.

EXAMPLE XIII

To 75 ml. of water is added 10 grams of a 0.7:1 random copolymer of methacrylic acid and maleic anhydride having a molecular weight of about 4000 to 6000. To the resulting solution is added 1.2 percent peracetic acid (by weight of the polymaleate). The solution which as a reddish-brown color is placed into a conventional Pyrex photochemical reaction vessel containing a Quartz water-jacketed immersion well containing a 200-watt, high-pressure mercury arc lamp characterized by a total irradiation of 25.18 watts as follows:

| Far U.V. 2,200 A.– 2,800 A. | Middle U.V. 2,800 A.– 3,200 A. | Near U.V. 3,200 A.– 4,000 A. | Visible 4,000 A.– 7,000 A. | Infra-red 10,000 A.– 14,000 A. | Total radiated energy |
|---|---|---|---|---|---|
| 2.88 | 4.14 | .346 | 10.6 | 4.1 | 25.18 |

Upon irradiation for approximately 2 hours, an essentially colorless solution is obtained. Upon evaporation of the water solvent, a near-white copolymer is obtained.

Substantially similar results are obtained when the following copolymers are photobleached in the above manner in lieu of the 0.7:1 copolymer of methacrylic acid and maleic anhydride: a 1:1 random copolymer of acrylic acid and maleic anhydride: a 1:4 random copolymer of 3-butenoic acid and maleic acid; a 1:1.9 random copolymer of methacrylic acid and maleic anhydride; a 1.2:1 random copolymer of crotonic acid and maleic acid; a 1:1.5 random copolymer of ethylene and maleic anhydride; and 1:8 random copolymer of 3-methyl-3-butenoic acid.

What is claimed is:

1. The process of bleaching a polymaleate homopolymer or random copolymer containing at least 45 mole percent of a maleate component selected from the group consisting of maleic anhydride, maleic acid and water-soluble salts of maleic acid which comprises irradiating the polymaleate homopolymer or random copolymer with ultraviolet light in the presence of a peracid while passing air or oxygen through the polymaleate.

2. The process of claim 1 wherein the irradiation is conducted in the presence of a solvent.

3. The process of claim 2 wherein the polymaleate homopolymer or random copolymer is present in an amount of from about 0.01 percent to about 50 percent.

4. The process of claim 3 wherein the solvent is selected from the group consisting of water, alkanols, alkyl ethers, aromatic ethers, cyclic ethers and glycol ether.

The process of claim 4 wherein the solvent is water.

6. The process of claim 5 wherein the peracid and polymaleate homopolymer or random copolymer are employed in a ratio of from about 1:1000 to about 1:10.

7. The process of claim 6 wherein the peracid and polymaleate homopolymer or random copolymer are employed in a ratio of from about 1:200 to about 1:40.

8. The process of claim 7 wherein the polymaleate homopolymer or random copolymer is irradiated with an ultraviolet source characterized by irradiation in the range of from about 200 m$\mu$ to about 700 m$\mu$.

9. The process of claim 8 wherein the ultraviolet radiation source provides from about $1\times10^{-10}$ to about $1\times10^{-5}$ einsteins/sec./cm.$^3$.

10. The process of claim 9 wherein the ultraviolet source is a high-pressure mercury arc lamp having a total power capacity of from about 50 watts to about 10,000 watts.

11. The process of claim 9 wherein the ultraviolet source is a low-pressure mercury lamp having a total power capacity of from about 0.5 watts to about 50 watts.

12. The process of claim 9 wherein the ultraviolet source is direct sunlight.

13. The process of claim 9 wherein the polymeric compound irradiated with ultraviolet light is a homopolymer of maleic anhydride having a molecular weight of from about 300 to about 50,000.

14. The process of claim 13 wherein the homopolymer of maleic anhydride has a molecular weight of from about 3,500 to about 7,000.

15. The process of claim 9 wherein the irradiation is conducted in the presence of an inorganic mineral acid.

* * * * *

PO-1050
(5/69)

UNITED STATES PATENT OFFICE
CERTIFICATE OF CORRECTION

Patent No. 3,635,806                         Dated  January 18, 1972

Inventor(s)  David C. Heckert

It is certified that error appears in the above-identified patent and that said Letters Patent are hereby corrected as shown below:

Column 1, line 6, "leaching should be changed to -- bleaching --.

Column 3, line 58, "1:2000" should read -- 1:200 --.

Column 5, line 2, "300 mµ" should be -- 330 mµ --.

Column 7, line 66, "copolymer" should be -- copolymers --.

Column 8, line 9, "anhydrid" should be -- anhydride --.

Column 10, line 56, "Example II" should be -- Example III --.

Signed and sealed this 1st day of August 1972.

(SEAL)
Attest:

EDWARD M. FLETCHER, JR.              ROBERT GOTTSCHALK
Attesting Officer                    Commissioner of Patents